July 22, 1969 G. HENF 3,457,013
OPTICAL CORRELATION NAVIGATION SYSTEM
Filed Oct. 27, 1966 5 Sheets-Sheet 1

INVENTOR.
GEORGE HENF
BY
ATTORNEY

July 22, 1969  G. HENF  3,457,013
OPTICAL CORRELATION NAVIGATION SYSTEM
Filed Oct. 27, 1966  5 Sheets-Sheet 2

INVENTOR.
GEORGE HENF
BY
H. A. Mackey
ATTORNEY

FIG. 4

July 22, 1969 G. HENF 3,457,013
OPTICAL CORRELATION NAVIGATION SYSTEM
Filed Oct. 27, 1966 5 Sheets-Sheet 5

FIG. 7

INVENTOR.
GEORGE HENF
BY *H. A. Mackey*
ATTORNEY

United States Patent Office 3,457,013
Patented July 22, 1969

3,457,013
OPTICAL CORRELATION NAVIGATION SYSTEM
George Henf, Palos Verdes Peninsula, Calif., assignor to Singer-General Precision, Inc., a corporation of Delaware
Filed Oct. 27, 1966, Ser. No. 589,920
Int. Cl. G06k 9/08
U.S. Cl. 356—71          14 Claims

ABSTRACT OF THE DISCLOSURE

The present invention relates to navigation systems for use by airborne vehicles. In particular the present invention relates to an optical correlation point fix-taking system for unilaterally determining the position of an airborne vehicle with reference to a predetermined strip of terrain substantially transverse to the path of flight.

---

One way of determining the exact position of an airborne vehicle is by obtaining a fix, referenced to some known point on the ground. This may be done as a unilateral operation or a bilateral operation. A bilateral operation may be one in which one or more ground stations cooperate with the aircraft for determining the position of the aircraft, for example. A unilateral operation is here considered to be an operation that takes place wholly from or within the aircraft.

In pilot-operated tactical aircraft, flying over unfriendly or hostile territory, it is almost necessary that any point fix taken for determining the position of the aircraft be a unilateral operation. Obviously, such fix taking may be performed by the pilot or navigator with reference to a map. However, when an aircraft is flying at a low altitude and at very high speed a problem of time for recognition and comparison exists. In addition, visual observation, by man, is not practical when the vehicle is an unmanned craft, such as a missile or other unmanned vehicle.

The present invention comprises apparatus for unilaterally taking a point fix from an airborne vehicle, while the vehicle is passing over a predetermined strip of terrain which is transverse to the ground track of the vehicle.

The point fix-taking operation is accomplished by correlation between the image of a scene and the corresponding section in a selected strip of real terrain lying transverse to the track of the vehicle, the vehicle itself passing over the strip of real terrain.

Correlation techniques may be regarded, in general, as relating to the matching or bringing into registration or coincidence two areas containing essentially the same pictorial content. The simplest example is that a pair of identical transparencies in contact with each other. When such a pair is held up to a light and one shifted with respect to the other, it will be observed that maximum light is transmitted through the pair when best matching or registration is achieved.

Another example of obtaining correlation would be the principle involved in the present application, that is, looking through a small size transparency at a large size ground area. When the two areas to be matched have the same pictorial content but different scale factors, that portion of the transmitted light representing the correlation function converges to a spot.

The present invention is complicated by the fact that the ground area that is being looked at is constantly changed, as by passing over the ground in a flying vehicle. The exact area which will match or correlate, with a portion of the transparency is unknown. To further complicate the porblem, the exact portion of the transparency which will correlate with the unknown area is also unknown. Since a portion of the transparency will correlate with some area on the ground (a predetermined condition) and those matchable areas have different scale factors, a correlation spot will appear and that spot may be detected. The time of occurrence of the correlation spot may be noted and the portion of the transparency may be determined. From this combined information a positive point fix, for the airborne vehicle from which the observation was taken, may be obtained.

When the two areas (a film and a section of the ground) are out of registration, i.e., not matched pictorially, for example, there is no correlation but some light from the ground passes through the film. The light passing through the film is diffused light and is normally referred to as background light or noise. It should further be pointed out that diffused light is present even when registration or a correlation spot is obtained, however, the correlation spot is normally greater in intensity than the combined strength of the diffused light.

It is recognized that there may be a false correlation spot or diffused light of greater than normal intensity. Such false correlation or intense diffused light may occur during a period of nonregistration and therefore may appear to be a correlation spot or function, which is here referred to as a false correlation.

The present invention provides for avoiding false correlations, as will be more fully described with reference to the drawings.

The apparatus includes a prepared film strip composed of a plurality of substantially mated scenes of adjacent sections of a strip of real terrain. Preferably the film strip includes a plurality of unseparated, substantially mated frames, each frame being of a different section of a strip of terrain taken substantially vertically above the section imaged. The entire strip of film is a composite of vertically taken photographs of the strip of terrain. The film strip is formed into a continuous or endless strip in which the ends of the film are joined, thus the ends of the film strip, at which the strip is joined to form a loop, are not photographs of adjacent sections of the strip of terrain.

The information (photograph) stored on the film strip may be the actual terrain data on either side of a predetermined fix point, as well as the fix point data. The data may be in the form of an actual series of mated frames of photographs of sections for the endless strip or may be a series of mated frames of the most outstanding reflection characteristics of the respective sections of the strip of real terrain. The latter form of data may, for example, be a two-level photographic representation of the strip of real terrain.

It becomes obvious that the intended or plotted track of the vehicle must be predetermined. Once the intended track is known, selection of a prepared film strip imaging or representing an image of a strip of terrain crossing and transverse to the intended track may be made. It also becomes obvious that the film strip is a prepared strip made, preferably, from photographs previously taken. Most ideally, the photographs from which the film strip is made, are recently taken photographs, although this is no prerequisite.

It is well-known that the actual track and the plotted or intended track of an airborne vehicle may differ. This may be due to cross-winds and/or navigation errors. It will be appreciated that a fix point may be projected and the projected fix point will lie at the intersection of the plotted track and the transverse strip of terrain. Since it is anticipated that an airborne vehicle may be off course, the strip of terrain and the image thereof on the continuous film strip, includes a strip (real terrain and image thereof) on both sides of the projected or predetermined fix point. It has been found that the strip of real terrain may be some 60,000 feet long and 1000 feet wide with the projected fix point in the center, so that the strip of terrain may include an area 1000 feet wide (along the track of the vehicle) and extending 30,000 feet on both sides of the center of the strip. The length of the strip of terrain is essentially determined by the length of the course and the allowable amount of deviation from the desired track. The width of the strip may also vary according to the speed and height of the vehicle. However, a width of 1000 feet will be found to be sufficient over a wide range of speeds and/or altitudes.

Although a strip of terrain of some 60,000 feet has been used experimentally and found to be successful, the invention is not to be limited to use of a strip of terrain of 60,000 feet since a shorter, or a longer strip may be used if desired. A film strip of the 60,000 foot strip may be as long as 120 inches when 35 millimeter film is used.

The present navigational system may be used for providing pinpoint delivery of an airborne vehicle at its destination by taking two or more point fixes along the track with means for providing mid-course flight correction according to the position of the vehicle with respect to the projected fix point of the strip of terrain over which the vehicle passes.

As a navigation system for airborne vehicles the present apparatus may be employed in several different ways. A single fix may be taken at some point along a leg or along the track or two or more point fixes may be taken. The former or single point fix would use only one film strip without the need of change. The latter or multiple point fixes may require use of two or more film strips, each film strip of a different strip of terrain crossing the track at different points.

It is assumed that a vehicle would normally employ a navigation system to generally maintain a particular track and the type of point fix system used (either single point fix or multiple point fixes) may depend on several factors. One factor would be the degree of accuracy desired with respect to bringing the vehicle to its point of destination. If the vehicle were a missile, for example, it may be desired to deliver the vehicle to a pinpoint target. Under such conditions multiple point fixes may be taken to insure accurate delivery of the vehicle to the target. This may require two or more film strips with apparatus for changing the film strip after each fix has been taken. One method of selecting a film strip from several film strips would be to prepare the film strips so that they are in parallel arrangement, adjacent to one another. In other words, the film strip would essentially be a very wide film strip made with the individual strips put together in parallel to form a wide loop. The film driving arrangement may be repositioned in steps or the opening or aperture could be moved so that only one strip passes by the opening at a time and the others are blocked.

More complex methods could be used as by placing each film strip in a cartridge and the cartridge could be notch-identified and the proper cartridge could be selected at the proper time. This, however, is not necessarily part of the invention.

Operationally, an airborne vehicle has a ground track when flying between a point of departure and a point of destination. The ground track may be predetermined. Inorder to take a point fix with the present apparatus a strip of terrain, which had previously been "captured" on film, would be selected as the area in which a point fix is to be taken. Since the location of the strip of terrain is known and it may be determined when the vehicle would be expected to cross the strip of terrain (rate×time=distance), the apparatus of the present invention would be "turned on" before the vehicle crosses the strip. When the vehicle crosses the strip of terrain a correlation signal is received indicating that the vehicle is then crossing the strip and means in the apparatus determines the lateral error by determining what section of the strip of film is correlating with the ground thereby identifying the strip of terrain over which the vehicle is actually passing.

It is therefore an object of the present invention to provide a continuous strip correlator for taking a point fix of an airborne vehicle.

Another object is to provide a continuous strip correlator which employs a fixed reticle.

Another object is to provide a continuous strip correlator for unilaterally taking a point fix of an airborne vehicle.

Another object is to provide a continuous strip correlator which generates two parallel correlation points controllably offset.

Another object is to provide a continuous strip correlator which avoids false correlations.

These and other objects will become apparent from reading the following detailed description with reference to the accompanying drawings in which.

Figure 1:
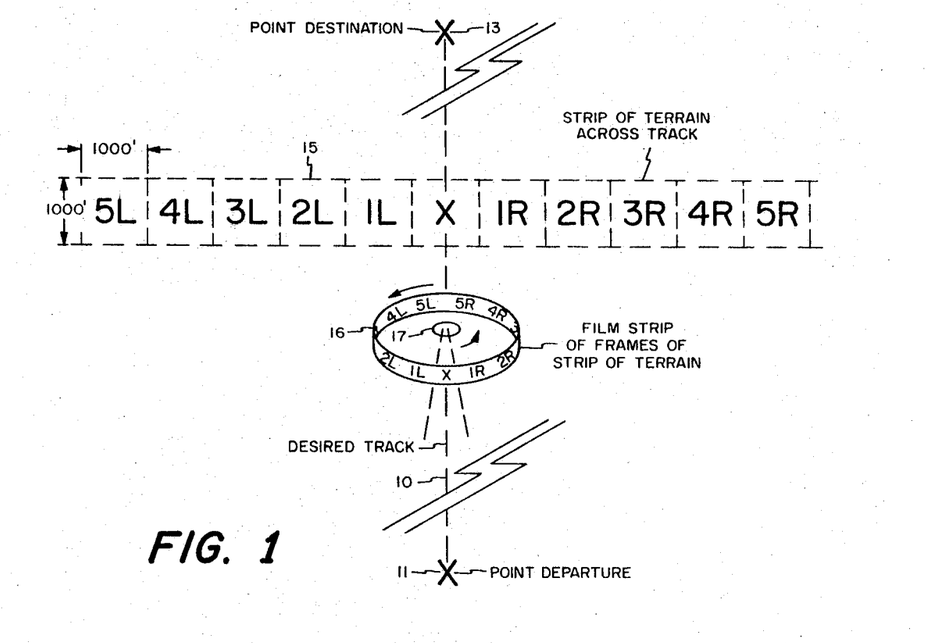
FIG. 1 is a diagram helpful in understanding the invention.

Referring to FIG. 1 in more detail, the relationship between the desired or proposed track 10 of an airborne vehicle or aircraft (between the point of departure 11 and the point of destination 13) and the strip of real terrain 15 is represented. For convenience the transverse strip of terrain is shown blocked off in sections of substantially 1000 feet each. The area sectioned off forming a strip of terrain would be substantially imaged on the film strip 16. The projected fix point would be the block X through which the desired track passes. If each block were 1000 feet long then the block X would extend 500 feet each side of the desired track.

The strip of terrain is represented as blocked off with 5 blocks to the left (1L to 5L) of the block X and 5 blocks to the right (1R to 5R) of block X. In actual practice the image of a strip of up to 30 blocks on each side of the projected point fix block (block X) has been used successively. In addition, the film strip 16 which is the image of the sectioned terrain so represented and a means 17 is represented for "looking" through the film strip. The aperture which essentially limits the field of view has been omitted but is shown in other figures.

Essentially, the terrain is theoretically sectioned off by identifying that portion of the film strip imaging the section.

Figure 2:
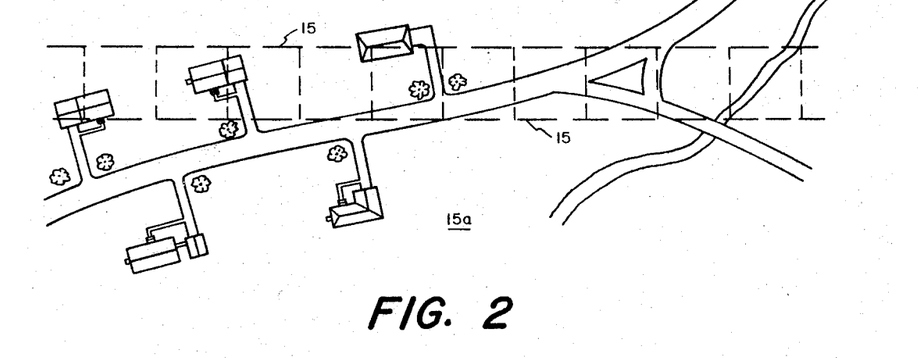
FIG. 2 is a representation of an area of real terrain across which is shown a sectioned strip.
Figure 2A:
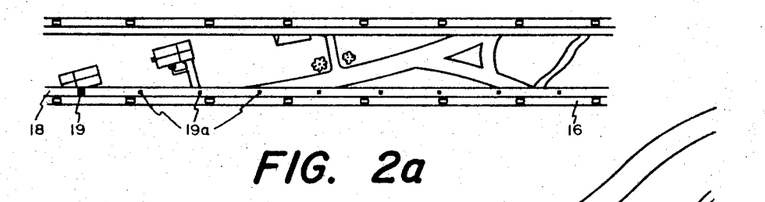
FIG. 2a is an illustration of a strip of film (greatly enlarged) of an image of the sectioned strip of terrain.

FIGS. 2 and 2a are presented to more clearly show and describe the nature of the film strip and its relation to the real terrain it images. FIG. 2 is a drawing of an area of real terrain. It will be appreciated that the area (terrain) 15a covered in FIGS. 2 and 2a is substantially smaller than would be covered in actual practice. That is, it was mentioned that the strip is preferably 1000 feet wide and each block of the strip is 1000 feet long. The area actually covered in FIG. 2 and the film image would be substantially less than the preferred dimensions.

The real terrain 15a of FIG. 2 shows a group of irregularly spaced houses with a roadway and stream. The real terrain pictures are presented as if seen from directly above. Across the real terrain picture a pair of broken lines 15 and broken lines sectioning the strip formed by the lines 15 are illustrated. The lines 15 show the section of that terrain imaged by the film strip 16 as shown in FIG. 2a.

It will be appreciated that the film strip 16 would be greatly reduced in size and is preferably a composite of a plurality of frames of films fitted together to form a seamless strip of film. In order to make the film an endless strip the film must be spliced. Such splice would be made by putting the extreme ends of the film together and forming the closed loop.

In order to provide a convenient method of identifying that part of the terrain which correlates with a part of the film strip, the film may be partitioned by use of a method of counting. A portion of the film strip such as 18 may include a series of spaced opaque spots which may block off light from a photodetector. A large spot, such as 19 may serve to provide a recycle and starting pulse and may be positioned to pass the photodetector when one pictorial end (at the splice) of the film passes by the opening or aperture. This may be seen represented in FIG. 7. The smaller opaque spots may serve to provide pulses for a counter, such as a bucket counter and, according to the count obtained at the time a correlation is made, the section of film which correlated with the terrain may be identified. Thus, the exact position of the aircraft may be determined at the time of correlation. The correlation spot will indicate that the aircraft is passing over the strip of terrain and the counter may serve to identify what part of the strip of terrain the aircraft is passing over. Obviously other methods of identification may be used to determine that portion of the film strip correlating with the terrain below.

Although FIG. 2a illustrates a pictorial film strip a two-level photograph may be used. This may be done on a gray scale by taking all dark tones up to some level and making them black and taking all tones over the determined level and making them white.

Figure 2B:
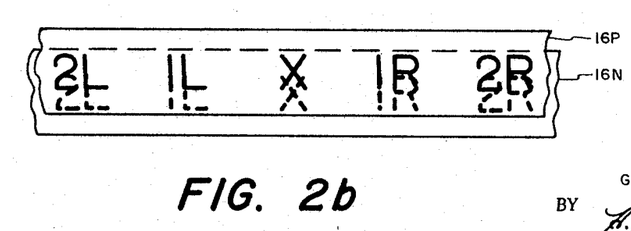
FIG. 2b is a representation of a strip film which is a composite of two films of the same strip of real terrain combined and offset to form a dual strip.

FIG. 2b represents an offset dual composite strip in which a positive film strip 16p and a negative film strip 16n (reverse characteristics) of the same strip of terrain are slightly offset from each other and combined to form an offset dual composite strip. The offset dual strip may be a composite of pictorial strips or each strip of the dual strip may be a two-level photograph, each photostrip reversed in level (one positive and one negative).

Actual practice has shown that an offset dual two-level composite strip, which casts two correlation functions (a white correlation spot for the positive film and a black correlation spot for the negative film) is very successful when used with a split-striped fixed reticle, with the split-stripes offset 180°. The split-stripe reticle 22s and the two correlation spots 24p and 24n may be seen in FIG. 4a. The combination of an offset dual composite film strip and a split-striped 180° offset reticle avoids false correlations and provides large signal-to-noise ratio for a correlation.

Figure 3:
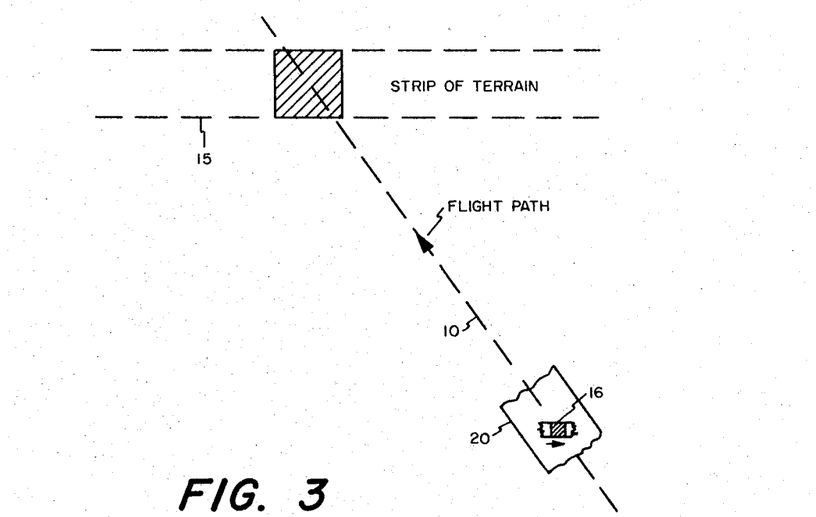
FIG. 3 illustrates the desired relationship between the strip of terrain and the strip of film with respect to the flight path of an airborne vehicle.

FIG. 3 represents the apparatus, represented by the film strip 16, in an aircraft 20 following a flight path 10 which will lead the aircraft over a selected strip of real terrain 15. It will be noted that the film strip 16 lies essentially parallel with the strip of terrain. Thus, it is here represented that the aircraft may pass over the strip of terrain on a substantially perpendicular flight path or track such as represented in FIG. 1, or may pass over the strip of terrain on an oblique flight path or non-perpendicular approach such as seen in FIG. 3.

In the event that the craft passes over the strip of terrain at a non-perpendicular angle, it is preferred that the film strip be pivoted so that the film strip and the terrain strip are in parallel relation. Apparatus to accomplish this is represented more clearly in FIG. 7.

Figure 4:
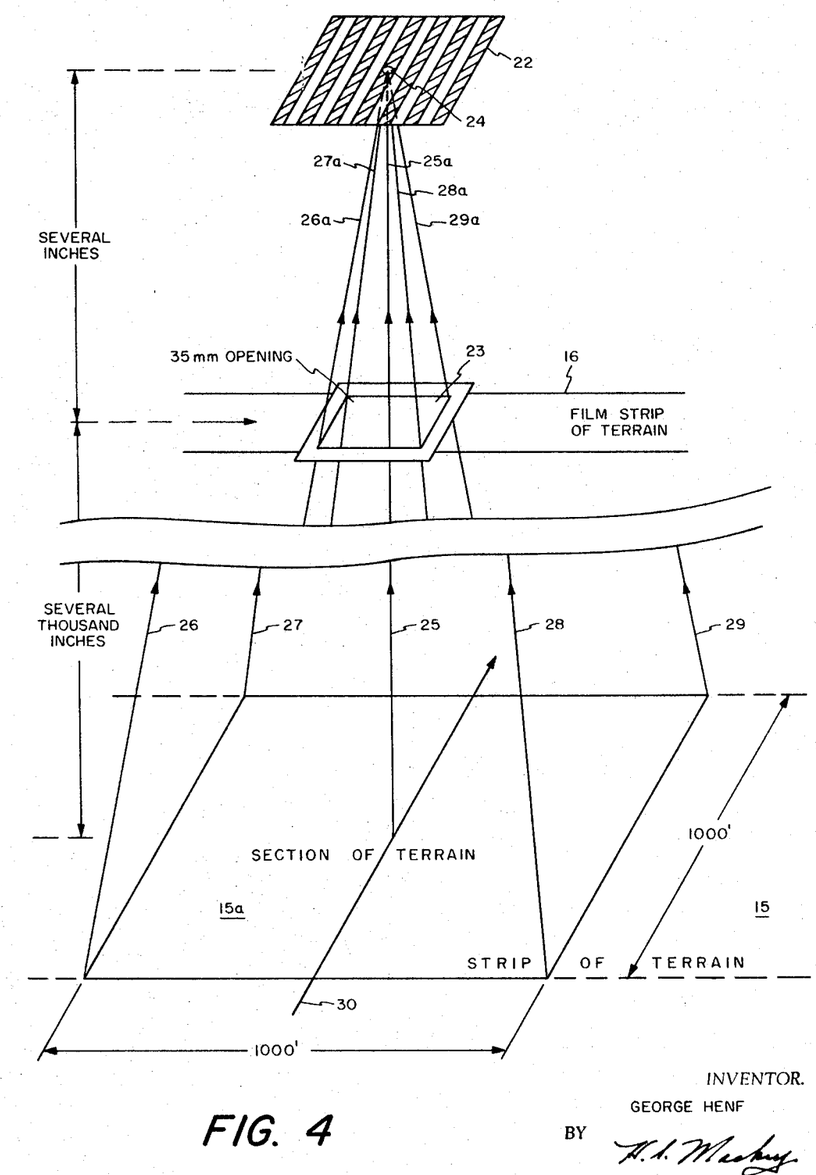
FIG. 4 represents the relationship between the terrain section, the film strip and the fixed reticle.

Referring to FIG. 4, the space relationship between the film strip 16 and the reticle 22 (represented as several inches apart) and the space relationship between the film strip 16 and the strip of terrain 15 (represented as several thousand inches apart) is shown.

It will be appreciated that the aperture 23 through which the light rays from the terrain pass is relatively small. The film strip may be 35 millimeter film thus the aperture may be substantially the size of a 35 millimeter frame. Other size film strips may also be used. The section of terrain (essentially an imaginary section) is preferably a 1000 foot square. However, the size of the field of view will depend on the area covered by the image on the film strip, the size of the aperture, and the distance between the apreture and the ground. The focal point of the correlation spot is a function of the scale of the image and the distance between the image and the terrain.

It will be observed that the reticle 22 is striped with alternately positioned opaque and transparent stripes. This is more clearly shown in its preferred form in the FIG. 4a where a 180° offset split-striped reticle is illustrated as 22s. A correlation spot or function 24 is formed on the reticle 22 by the light rays coming from the terrain and passing through the film of the same pictorial content. Above the reticle is a photodetector (not shown) which detects the light passing through the transparent stripes of the reticle. It will be understood that although a correlation spot is formed when the image and the terrain have the same pictorial content there is scattered throughout and across the reticle diffused light substantially lower in intensity than the correlation spot. The photodetector "sees" the diffused light and this is converted into corresponding electrical signals referred to as background noise. This is brought out in FIG. 5. When the photodetector "sees" the correlation spot a signal of relatively large amplitude is provided, such as shown in FIG. 6 which essentially overrides the background noise signal. The physical relationship between the various components may be seen more readily in FIG. 7.

Several lines representing light rays are shown in FIG. 4. The line 25–25a appears as the center line or ray while the lines 26, 27, 28 and 29 and the respective extension lines 26a, 27a, 28a and 29a are provided to show that the lines of light from the ground pass through the aperture 23 (passing through the pictorial content of the film which images the corresponding ground area) and converge on the recticle 22 as a correlation spot 24.

It will be appreciated that if the film strip is moving, for example, rotated, and as an image of the section of terrain (such as the pictorial image of 15a) moves into the aperture 23, a correlation spot 24 will first appear on the edge of the reticle 22. As the film advances through the aperture and the image corresponding to that section of the terrain moves into the center of the aperture 23, the correlation spot 24 will move from the side of the reticle across the reticle.

When a photodetector is positioned above the reticle so that the photodetector may detect and/or respond to the light passing through the reticle the correlation spot 24 will be detected as the spot crosses the transparent sections of the striped reticle 22. When the correlation spot or any part of the spot passes through a transparent section of the reticle, the photodetector will convert this light energy into an electrical signal of proportional value. This gives rise to an alternating signal since, when the correlation spot is on the opaque strip of the reticle, the photodetector cannot "see" the correlation spot and will respond to the only light it "sees," that is the diffused light. It was previously mentioned that the diffused light is substantially less intense than the correlation spot.

Figure 5:
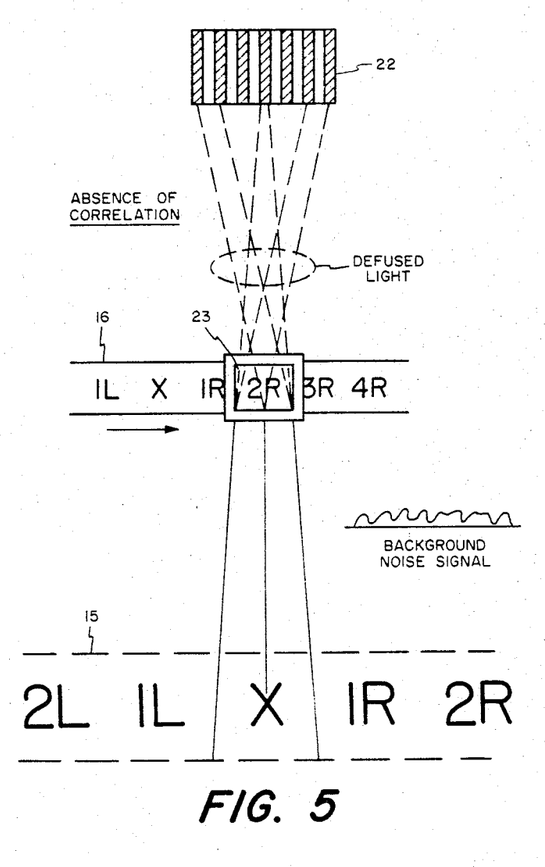
FIG. 5 represents a condition where there is an absence of correlation.
Figure 6:
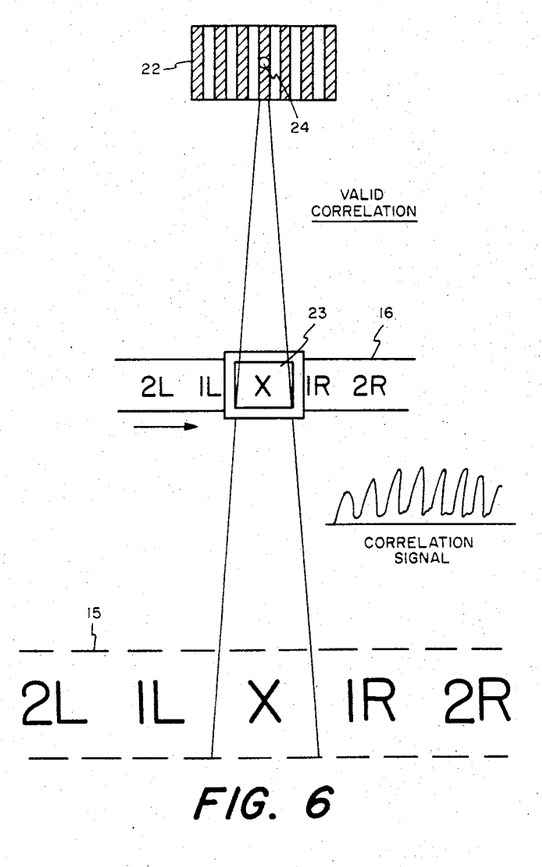
FIG. 6 represents a condition of valid correlation.

Attention is directed to FIG. 5 which indicates the condition where the pictorial features of the film 16 and that section of the ground seen through the aperture 23 are out of registration and therefore there is an absence of correlation. The light passing through the aperture and film is diffused thereby casting low intensity light all over the reticle 22. The photodetector (not shown) "sees" the diffused light and thus the background noise signal, such as represented, is generated.

FIG. 6 illustrates a condition where the pictorial content of the film 16 and the section of terrain are in registration therefore generating a valid correlation spot or function 24 on the reticle 22.

It should be understood that the reticle 22 is a fixed reticle and the rotation of the film 16 which has been successfully rotated at a speed of 120 inches per second, causes the correlation spot to move across the reticle, as above described.

It will be noticed that a representation of a correlation signal is presented in FIG. 6. When the correlation spot is passing across a transparent stripe a relatively large signal is provided. When the correlation spot is passing across an apaque stripe the signal is reduced until the correlation spot is completely hidden and the amplitude of the signal corresponds to the intensity of the diffused light or background noise signal.

The stripes are relatively thin and according to the width of the stripes and the speed of rotation of the film a pulsed signal of predetermined frequency is produced.

Figure 4A:
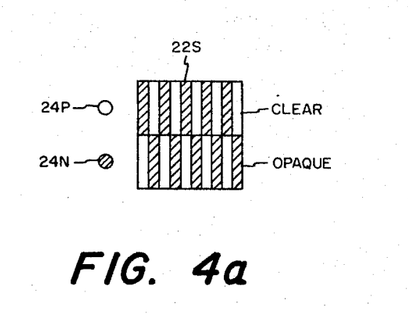
FIG. 4a illustrates the preferred form of fixed reticle.

Returning to FIG. 2b it will be remembered that a dual offset composite film of a positive film strip and a negative film strip was described. Also it was stated that two correlation spots are provided, the separation of which is a function of the offset of the films. In addition FIG. 4a shows the alternately striped 180° offset reticle 22s which is the preferred form of fixed striped reticle for avoiding false correlation indications. In FIG. 4a two correlation spots 24p, a white spot, and 24n, a black spot, are shown since the positive film provides a wide or positive correlation spot and the negative film provides a black or negative correlation spot.

Figure 4B:
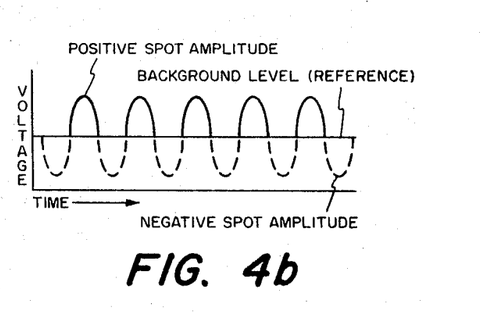
FIG. 4b represents graphically the correlation signal provided when employing the preferred form of fixed reticle.

FIG. 4b shows graphically a signal which will be provided by the two correlation spots 24p and 24n passing across the alternately striped 180° offset fixed reticle 22s. It will be appreciated that diffused light is always present and such diffused light serves as a background or reference level. The negative or black correlation spot 24n passing through a transparent stripe of the reticle 22s subtracts from the intensity of the diffused light thus reducing the level of the electrical signal output of the photodetector to below the normal reference level. This is represented by a broken line curving below the reference line. The positive or white correlation spot 24p passing through a transparent stripe increases the intensity of light passing through the reticle 22s to be substantially greater than the reference level. Thus the electrical signal output of the photodetector is increased as represented by the solid line curve above the reference level.

With this combination (the offset, two-film strip, represented in FIG. 2b, and the alternately striped 180° offset reticle, represented in FIG. 4a) false correlations, which may be the result of intense background noise, is virtually eliminated. This results from the fact that the diffused light (background noise) is spread across the reticle which will essentially increase the reference level while the dual correlation spot provides a detectable signal having differential characteristics which characteristics are absent from the background noise.

With reference to the stripes on the reticle as shown in FIG. 4a, the stripes may be uniform in width and spacing and the signal generated would then be as represented in FIG. 4b. However, each half of the reticle, that is, the upper half (across which the correlation spot 24p is represented to travel) and the lower half (across which the correlation spot 24n is represented to travel) may have different width strips. This would result in the positive spot amplitude pulse occurring at one frequency and the negative spot amplitude pulse occurring at a different or another frequency. If an alternately striped offset reticle as just described were used the negative-going pulses and the positive-going pulses of the correlation signal would partly overlap. Thus, uniform spacing of both halves of the fixed reticle is preferred.

Figure 7:
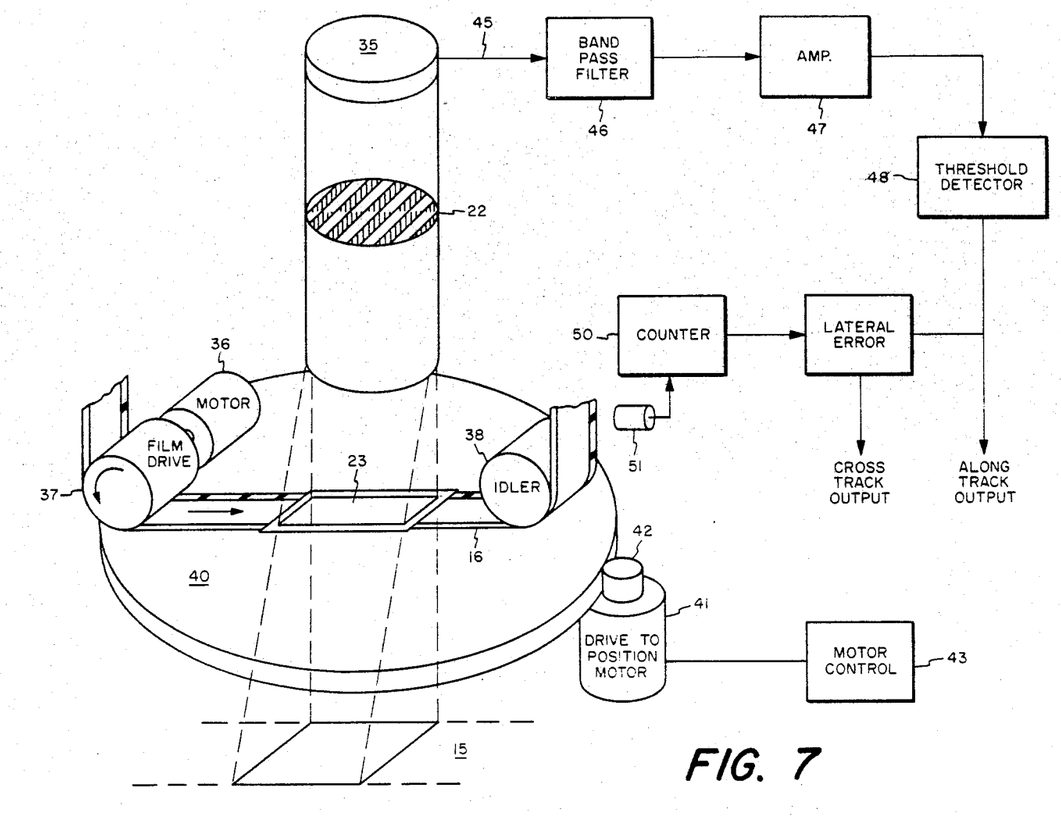
FIG. 7 represents, partly in block and partly in structural form one form of the present invention.

Referring now to FIG. 7 the film strip assembly including the film strip 16, a motor 36, a film drive wheel 37 and an idler wheel 38 are represented as mounted on a rotatable plate 40. The aperture 23 is framed off over a hole in the plate 40. Above the aperture 23 is mounted the fixed reticle 22 and a photodetector 35. These several components are mounted on the plate 40. The plate 40 may be rotated as by the motor 41 by use of the gear or pinion 42. A motor control, block 43, may be manually controlled so as to activate the motor 41 to rotate the plate 40 to a position where the film strip lies parallel with the strip of terrain 15. This relationship is represented in FIG. 3. The motor 41 could be a reversible motor and the motor control 43 could be a three-position switch for driving motor 41 so as to rotate plate 40 either clockwise or counterclockwise.

The photodetector 35 senses the light passing through the transparent stripes of the reticle 22. The photodetector 35 converts the optical or light energy into corresponding electric energy and provides an output over line 45.

With respect to the correlation signal frequency, the signal is modulated as represented in FIG. 4b. The modulation frequency is a function of the film speed and the size and spacing of the stripes on the reticle. The film speed has been found to provide satisfaction at 120 inches per second and the spacing of the stripes on the reticle was found to be satisfactory at $\frac{1}{25}$ inch spacing.

Thus:

$$\text{modulation frequency} = \frac{120 \text{ inches/second}}{2 \times \frac{1}{25} \text{ inches/second}} \quad (1)$$

modulation frequency=1500 cycles per second.

With the assumed values the correlation signal frequency would be approximately 1500 c.p.s. and would occur at a rate which is a function of the length of the film, the speed of rotation, the size of the field of view and the along-track velocity. A formula for the number of times a correlation signal would occur is:

$$\text{Total number of scans} = \frac{\text{film velocity}}{\text{film length}} \times \frac{\text{along-track ground coverage}}{\text{along-track velocity}} \quad (2)$$

For velocity of 120 inches per second, a field of view of 1000 feet and an along-track velocity of 2500 feet/second the:

$$\text{Number of scans} = \frac{120 \text{ inches/second}}{8 \text{ inches}} \times \frac{1 \text{ second}}{2.5}$$

$$= 15 \times \frac{1}{2.5}$$

$$= 6 \text{ scans} \quad (3)$$

Thus, the correlation signal, under such conditions, would occur six (6) times as the aircraft crosses the strip of terrain.

The output of the photodetector is applied to a band-pass filter 46 which essentially passes those frequencies at the correlation signal frequency. The filtered signal is applied to an amplifier 47 which amplifies and passes the signal to a threshold detector 48. Since the correlation signal is of substantially greater amplitude than the background or reference the threshold may be an amplitude level. However, at this point the correlation signal has been filtered to substantially provide the 1500 cycle signal and the threshold detector functions to attenuate any low amplitude background noise that may have been passed by the filter 46. Thus the signal output from the threshold detector 48 may be used to determine when the strip of terrain is crossed. In order to point fix the vehicle at its position with respect to lateral error a counter 50 is used to count the spots 19a along the film 16 (seen in FIG. 2a). The spots may be counted by a photodetector, such as 51, for example. The spots being offset along the film so that, for example, the large spot 19 passes the photodetector 51 when the beginning of the film is in the aperture 23. The large spot 19 may generate a response by the photodetector 51 so as to reset and start the counter from the beginning of the count, thereby wiping out any previous count. The count signal may be in the form of a digital signal or an analog signal, or any other type of counter may be used which has very rapid recovery. The frame of film in the aperture may then be determined by the count on the counter. The output of the threshold detector 48 is also applied to the lateral error detector 53. When the correlation signal occurs the output of the threshold detector will sample the count on the counter and according to such count the lateral error of the vehicle, to the left or the right of the predicted section (intersecting with the desired track) may be determined.

The present invention has been described in its lensless form. In such form the present point fix taking apparatus may be used from altitudes as low as "ground level" for flying vehicles to extremely high altitudes. At higher altitudes, for example above 12,000 feet above the ground, it may be necessary to employ a different scale factor with respect to the film image of the strip of terrain on which the point fix is to be taken. The change in scale factor will result in reduced accuracy of pinpointing. The reduction in accuracy is seen to be a function of the altitude of the vehicle, coupled with the fact that the image on the film covers a substantially larger terrain area.

It will be obvious to those skilled in the art that an optical arrangement may be provided for high flying aircraft where the scale factor of the film remains the same as that used for a lensless arrangement for low flying craft. An optical system may be used to essentially limit the field of view of the terrain beneath the airborne craft and essentially transfer an image of the field of view on to an image plane with which the field image may be compared for correlation.

The present invention has been described in its preferred form and several alternate forms of some components have been described. Other changes, which may include substitution of and/or rearrangement of parts, may be made, as will be obvious to those skilled in the art, without departing from the spirit of the invention as defined in the appended claims.

What is claimed is:

1. Navigation apparatus for taking a point fix from an airborne vehicle in flight along a predetermined flight path and referenced to a predetermined point along said path including;

image means for simulating, in reduced scale, a strip of the real terrain extending generally transverse to and intersecting with the flight path of said vehicle, said strip of real terrain including said predetermined point at the intersection of said flight path and said strip of real terrain, an aperture for limiting the field of view of the terrain below said vehicle and for limiting the portion of said image means exposed to said field, means for continuously driving said image means past said aperture for continuously changing that part of the image of said strip of terrain exposed in said aperture, said image means, aperture and driving means combining to provide a correlation spot when the exposed part of said image means is in registration with that part of said strip of real terrain in said field of view, a fixed reticle having alternately positioned opaque and transparent stripes for alternately blocking and passing said correlation spot, means for converting light energy into corresponding electric energy positioned for receiving light energy passed through said reticle, and means for detecting electric signals from said converting means which correspond to the light energy of the correlation spot passing through said reticle for detecting when a portion of said image means and a portion of said strip of real terrain are in registration.

2. Navigation apparatus as in claim 1 and in which said image means includes;

a strip of film in the form of an endless strip, said strip being substantially a composite of a plurality of frames of film each of adjacent portions of said strip of real terrain, and each frame of said plurality of frames of film is a view of the respective portion of said strip of real terrain taken from directly above the respective portion.

3. Navigation apparatus as in claim 1 and in which said image means includes;

a strip of film in the form of an endless film strip, and said film strip is a two-level photograph of said strip of terrain.

4. Navigation apparatus as in claim 1 and said image means includes;

a first strip of film pictorially simulating said strip of real terrain in positive form, a second strip of film pictorially simulating said strip of real terrain in negative form, and said first and second strips of film are overlayed and offset for forming a composite offset pictorial double image in reverse pictorial characteristics of said strip of real terrain.

5. Navigation apparatus as in claim 3 and said strip of film further includes;

a first strip of film simulating said strip of terrain in two-level positive form, a second strip of film simulating said strip of terrain in two-level negative form, and said first and second strips of film are overlayed and offset for forming a composite offset double image of said strip of terrain in reverse two-level characteristics.

6. Navigation apparatus as in claim 1 and in which said means for imaging is a drum having a continuous image of said strip of terrain around the perimeter thereof.

7. Navigation apparatus as in claim 1 and in which said image means includes;

a disc having a continuous image of said strip of terrain on the face thereof about the periphery.

8. Navigation apparatus as in claim 1 and said image means includes;

a first strip of film simulating said strip of real terrain in reduced scale in positive image, a second strip of film simulating said strip of real terrain in said reduced scale in negative image, said first and second strips of film are overlayed and offset from each other providing a composite offset double image of said strip of terrain for providing a positive correlation spot and a negative correlation spot when a part of said composite offset double image is in registration with that part of said strip of real terrain in said field of view, and the alternately positioned opaque and transparent stripes of said fixed reticle are split at the longitudinal center of said reticle and offset 180 degrees for alternately passing said positive correlation spot and said negative spot in sequence.

9. Navigation apparatus as in claim 1 and further including;

means for identifying that part of the said image means then exposed in said aperture, and means responsive to said detecting means for indicating that part of said image means in registration with the terrain in the field of view for determining the exact position of the airborne vehicle when registration between a portion of the image means and the real terrain in the field of view occurs.

10. Navigation apparatus for taking a point fix from an airborne vehicle in flight, along a predetermined flight path and referenced to a predetermined point along said path including;

a continuous strip of film having an image thereon in reduced scale of a predetermined strip of real terrain lying transverse to and intersecting with said path and, said strip of real terrain including said predetermined point at the intersection of said predetermined flight path and said strip of real terrain and, said predetermined point positioned substantially interim the ends of said strip of real terrain, an aperture positioned between said strip of film and the terrain below said vehicle for limiting the field of view of the terrain below said vehicle and for limiting the portion of said continuous strip exposed to said field of view, means for continuously rotating said continuous strip for driving said strip of film through said aperture for continuously changing that portion of said film strip exposed to said field of view, a reticle fixedly positioned on that side of said strip of film away from said aperture, said fixed reticle having alternately positioned opaque and transparent portions for alternately blocking and passing light rays passing through said aperture and said strip of film and said reticle positioned substantially at the focal point of the correlation spot formed by registration between a part of said film strip exposed in said aperture and a part of the real terrain in the field of view, means for converting light energy into electric energy having comparable characteristics said converting means positioned for receiving light energy passed through said reticle, and means for detecting electric signals from said converting means which correspond to the light energy of the correlation spot passing through said reticle.

11. Navigation apparatus as in claim 10 and further including;

means for identifying that portion of said film strip then in said aperture and for providing a signal representative of said that portion, and means responsive to said detecting means for indicating that portion of said film strip in registration with the real terrain in the field of view for determining the exact position of the said airborne vehicle.

12. Navigation apparatus as in claim 10 and in which the image on said continuous strip of film is a two-level representation of the reflection characteristics of said strip of terrain.

13. A continuous strip correlator for taking a point fix from an airborne vehicle in flight, along a predetermined flight path, said point fix being referenced to a predetermined point along said flight path including;

a continuous strip of film having an image thereon, in reduced scale of a predetermined strip of real terrain lying substantially transverse to an intersecting with said flight path, said strip of real terrain including said predetermined point at the intersection of said flight path and said strip of terrain and positioned interim the ends of said predetermined strip of real terrain, means for providing a limited field of view of the terrain below said airborne vehicle for limiting reception of light rays transmitted from the real terrain below the said vehicle to substantially those from the real terrain in the said field of view, means for rotating said continuous strip of film past the last described means for continuously changing the image content of said film strip exposed to said transmitted light rays, said film strip and said last described means and said rotating means combining to provide a correlation spot when the exposed part of said film strip is in registration with that part of the real terrain in said field of view, a reticle positioned in the focal plane of said correlation spot and having alternately positioned opaque and transparent stripes for alternately blocking and passing said correlation spot, light sensitive means for converting light energy into corresponding electric energy positioned for receiving light energy passed through said reticle, and means for detecting the electric signals from said light sensitive means which correspond to the light energy of said correlation spot passing through said reticle.

14. A continuous strip correlator as in claim 13 and further including;

means for identifying that part of said continuous strip then exposed in said means for providing a limited field of view, and means responsive to said detecting means for indicating that part of said continuous strip in registration with said real terrain in said field of view for determining the exact position of said airborne vehicle when registration occurs.

References Cited

UNITED STATES PATENTS

| | | |
|---|---|---|
| 2,482,242 | 9/1949 | Brustman. |
| 2,884,540 | 4/1959 | Shockley. |
| 3,041,011 | 6/1962 | Dhanes. |
| 3,155,967 | 11/1964 | Burtner. |
| 3,221,301 | 11/1965 | Moyroud. |
| 3,288,018 | 11/1966 | Belchis et al. |
| 3,358,149 | 12/1967 | Preikschat. |

JEWELL H. PEDERSEN, Primary Examiner

WARREN A. SKLAR, Assistant Examiner

U.S. Cl. X.R.

250—219; 343—5; 346—146.3